US008283815B2

(12) United States Patent
Vollmer (10) Patent No.: US 8,283,815 B2
(45) Date of Patent: Oct. 9, 2012

(54) ELECTRICAL MACHINE

(75) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 389 days.

(21) Appl. No.: 12/293,349

(22) PCT Filed: Feb. 20, 2007

(86) PCT No.: PCT/EP2007/051598
§ 371 (c)(1),
(2), (4) Date: Sep. 17, 2008

(87) PCT Pub. No.: WO2007/107420
PCT Pub. Date: Sep. 27, 2007

(65) Prior Publication Data
US 2009/0072634 A1 Mar. 19, 2009

(30) Foreign Application Priority Data
Mar. 17, 2006 (DE) .......................... 10 2006 012 736

(51) Int. Cl.
H02K 41/02 (2006.01)
(52) U.S. Cl. ................ 310/12.24; 310/12.29; 310/12.21; 310/12.22
(58) Field of Classification Search ............... 310/12.18, 310/12.24, 12.29, 12.21, 12.22
See application file for complete search history.

(56) References Cited

U.S. PATENT DOCUMENTS

| 4,370,577 A * | 1/1983 | Wakabayashi et al. .... 310/12.24 |
| 4,504,750 A * | 3/1985 | Onodera et al. ........... 310/12.21 |
| 4,563,602 A * | 1/1986 | Nagasaka .................. 310/12.22 |
| 5,010,262 A * | 4/1991 | Nakagawa et al. ........ 310/12.21 |
| 5,218,250 A * | 6/1993 | Nakagawa ................. 310/12.21 |
| 5,302,873 A * | 4/1994 | Takei .......................... 310/12.24 |
| 6,087,742 A * | 7/2000 | Maestre ..................... 310/12.24 |
| 6,279,728 B1 * | 8/2001 | Jung et al. .................... 198/619 |
| 6,509,664 B2 * | 1/2003 | Shah et al. .................... 310/181 |
| 6,522,035 B1 * | 2/2003 | Smit ............................ 310/12.18 |
| 6,548,919 B2 * | 4/2003 | Maki et al. ................. 310/12.21 |
| 6,548,920 B2 * | 4/2003 | Joong et al. ................ 310/12.21 |
| 6,570,274 B2 * | 5/2003 | Kim et al. .................. 310/12.21 |
| 6,614,137 B2 * | 9/2003 | Joong et al. ................ 310/12.21 |
| 6,661,124 B1 * | 12/2003 | Seki et al. .................. 310/12.21 |
| 6,703,726 B2 * | 3/2004 | Itoh et al. ................... 310/12.02 |
| 6,960,858 B2 * | 11/2005 | Kawai ........................... 310/181 |
| 7,004,694 B2 * | 2/2006 | Kim et al. ....................... 410/12 |

(Continued)

FOREIGN PATENT DOCUMENTS

| DE | 33 34 501 A1 | 3/1984 |
| EP | 0 373 987 A1 | 6/1990 |
| EP | 1 045 509 A1 | 10/2000 |
| EP | 1 156 579 A1 | 11/2001 |
| WO | WO 2006114390 A1 * | 11/2006 |

*Primary Examiner* — Quyen Leung
*Assistant Examiner* — Alex W Mok
(74) *Attorney, Agent, or Firm* — Henry M. Feiereisen, LLC (57) ABSTRACT

The invention relates to an electrical machine (1, 110), which is in particular a synchronous machine, which has a primary part (3, 130) and a secondary part (5, 120), wherein the primary part (3, 130) has a) a first means (9) for producing a first magnetic field and b) a further means (17, 27, 29) for producing a further magnetic field, which in particular is an exciter field, and wherein the first means (9) has at least one winding, and the further means (17, 27, 29) is arranged in the region of an active air gap (21) of the electrical machine between the primary part and the secondary part and has magnetic poles, each having at least one permanent magnet (17).

11 Claims, 5 Drawing Sheets

U.S. PATENT DOCUMENTS

| | | | |
|---|---|---|---|
| 7,154,198 B2 * | 12/2006 | Kawai | 310/12.15 |
| 7,859,142 B2 * | 12/2010 | Armeit et al. | 310/12.24 |
| 8,022,587 B2 * | 9/2011 | Hoppe | 310/181 |
| 2002/0043879 A1 * | 4/2002 | Joong et al. | 310/12 |
| 2002/0053850 A1 * | 5/2002 | Shah et al. | 310/166 |
| 2004/0070286 A1 * | 4/2004 | Marzano | 310/12 |
| 2005/0082934 A1 * | 4/2005 | Kawai | 310/181 |

* cited by examiner

ELECTRICAL MACHINE

BACKGROUND OF THE INVENTION

The invention relates to an electric machine and to a primary part of an electric machine.

Electric machines have a primary part and a secondary part. The primary part is in particular opposite the secondary part. The primary part is intended to be supplied with electrical current. The secondary part has, for example, permanent magnets or windings which can be supplied with current. The windings which can be supplied with current, in the case of a synchronous machine, can be supplied with current for example by means of a power converter or, in the case of an asynchronous machine, are supplied with current by induction.

In such electric machines, both the primary part and the secondary part consequently have active magnetic means, which can be used to generate a magnetic field. Active magnetic means are, for example, a winding which can be supplied with current, permanent magnets or a winding in which an electrical current flow can be brought about by means of induction, it being possible to produce a magnetic field owing to the electrical current flow brought about.

The design of such an electric machine is very complex since both the primary part and the secondary part need to have means for producing a magnetic field. This relates in particular to synchronous machines.

SUMMARY OF THE INVENTION

The object of the present invention is to specify a simplified electric machine and a primary part for such an electric machine, as a result of which it can be constructed in a simplified and more cost-effective manner. Furthermore, the losses, in particular the losses due to axial magnetic leakage, are to be reduced. Such a simplified and optimized construction is sought in particular in the case of a synchronous machine.

In an electric machine according to the invention which has a primary part and a secondary part, the primary part is designed such that it has two means for producing a magnetic field. The secondary part is free of means for producing a magnetic field. The primary part therefore has a first means for producing a magnetic field and a further means for producing a magnetic field, it being possible for an AC voltage or an alternating current to be applied to the first means for producing a magnetic field. The first means for producing a magnetic field, which is a first magnetic field, is, for example, a winding. The further means for producing a magnetic field, which is an excitation field, is a means with which a further, i.e. at least a second, magnetic field can be produced. The field excitation which is produced by the further magnetic field is advantageously unchanged, i.e. constant, during operation. Such a further means for producing the further magnetic field is, for example, a permanent magnet or a winding, to which a constant current is or can be applied.

The further means for producing a further magnetic field advantageously has a large number of further means for producing magnetic alternating-pole field excitation.

The first means for producing a first magnetic field is, for example, a coil winding, the first magnetic field, which emerges from the coil or enters said coil, being conducted to further means (i.e. second, third, etc.) for producing further magnetic fields such that at least two further means for producing further magnetic fields are in the field region of the first magnetic field in order that interaction is brought about between the two magnetic fields. The further means for producing further magnetic fields advantageously have a large number of magnetization directions, which are in each case in opposite directions to one another, whereby an arrangement with alternating-pole magnetization is provided.

The electric machine, which has a primary part and a secondary part, the primary part having a first means for producing a first magnetic field, and the secondary part having a means for guiding the magnetic field, is therefore designed such that the primary part has at least two further means for producing at least two further magnetic fields, the first means for producing the first magnetic field being arranged with respect to the further means for producing the further magnetic fields such that superimposition of the first magnetic field with the further magnetic fields is made possible.

Such a construction for the electric machine has the advantage that the secondary part of the electric machine does not have any active means for producing a magnetic field. The secondary part of such an electric machine only has a means for guiding magnetic fields and is therefore simple and inexpensive to manufacture. The secondary part is laminated, for example, in order to avoid eddy currents.

Soft iron parts can advantageously be used for the structural design of the primary part and the secondary part. The lamination of these parts reduces eddy currents. In further embodiments, the soft iron parts can also be designed to be solid and/or in the form of so-called powder-pressed parts.

The object is further achieved by means of an electric machine, which is a synchronous machine, the electric machine having a primary part and a secondary part, and the primary part having a first means for producing a first magnetic field, and furthermore a further means for producing a further magnetic field, the first means being a winding, and the further means being at least one permanent magnet. The further means is, in particular, a large number of means, i.e. a large number of permanent magnets. In such a configuration of the electric machine according to the invention, all of the means for producing a magnetic field are in the primary part. The secondary part merely has a means for guiding magnetic fields and is, for example, designed such that it preferably has a toothed structure on the surface aligned with the primary part. This means is in particular an iron-containing means, such as a laminate stack, for example. The gaps in the toothed structure are advantageously filled with amagnetic material, so that a planar area is present.

The secondary part and/or the primary part are, for example, designed such that they have teeth. A tooth pitch of the secondary part and a tooth or magnet pitch of the primary part can be either the same or different. For example, when the pitch is the same, coils of one motor winding phase are grouped and arranged with an offset of 360°/m with respect to further coil groups of the other motor winding phases. "m" denotes the number of phases or winding phases. The tooth pitch of the secondary part (Tau_Sec) predetermines the pole pitch of the machine (Tau_p) and Tau_tooth,sec=2*Tau_p applies.

In one embodiment of the electric machine according to the invention, the tooth pitch of the secondary part is, for example, an integral multiple of the magnet pitch of the primary part. However, the electric machine can also be configured such that the tooth pitch of the secondary part is not an integral multiple of the magnet pitch of the primary part.

By means of an electric machine according to the invention it is possible, for example, to construct a linear motor. In the case of such a linear motor, for example permanent magnets are integrated in a coil-bearing primary part of the linear motor. This configuration has cost advantages in particular in the case of long displacement paths. The secondary part of the linear motor in this case comprises, for example, only an iron reaction rail. As a result, the reliability of the linear motor is also increased with respect to comparable linear motors.

The cost advantages in such a linear motor result, for example, from the fact that, until now, the linear motor, which is a synchronous linear motor, has had a primary part which can be excited electrically and which is opposite a secondary part fitted with permanent magnets. In this case, a long stator design and also a short stator design are possible. In one case, a very large amount of copper is required, and in the other case a very large amount of magnet material is required. Both entail high costs. The permanent magnets accommodated in the secondary part in already known linear motors form an open path. The magnets (permanent magnets) need to be protected over the entire length from environmental influences such as chips, oil or other impurities, which is complex. Furthermore, owing to the strong forces of attraction of the permanent magnets over the length of the secondary part, care needs to be taken to ensure protection against personal injury. These protective measures also bring about costs and technical complexity. It is possible to considerably reduce the complexity with the aid of a secondary part of the electric machine according to the invention.

According to the invention, the permanent magnets can be integrated in the primary part, with the result that coils (windings) and magnets (permanent magnets) are accommodated in the same part (primary part) of the electric machine. Considerably less magnet material is required in comparison with the known motor principle for a short stator design. Since the primary part has in any case already been protected until now from environmental influences and protection against personal injury has already been taken into consideration there, when integrating the magnets in the primary part additional protective apparatuses are no longer required. The secondary part advantageously only comprises an iron reaction rail which does not represent any risk.

In order to reduce, in particular, the axial leakage losses, magnetic separation is provided between the magnetic poles of the primary part.

This gap is filled with air or an amagnetic material. These gaps firstly save soft-magnetic material and secondly considerably increase the useful magnetic flux. Increases in performance of up to 100% can be achieved in this case.

The gaps are also suitable for forced air cooling. If liquid cooling is provided, corresponding cooling ducts which are composed of amagnetic material have to be laid in the gap. These cooling ducts preferably run in a meandering fashion across the laminate stack of the primary part.

This gap width is advantageously greater than or equal to the effective air gap width (between the secondary part and the primary part).

The electric machine according to the invention is in particular a synchronous machine. Synchronous machines can be regulated precisely and can satisfy stringent requirements for movement accuracy and positioning accuracy. The simple or compact design of the synchronous machine according to the invention results in a very wide variety of advantages, which have been touched on already in the description above.

Cogging torques occurring can be reduced in accordance with already known methods. Such methods are, for example: skewing of the permanent magnets, skewing of toothing, etc.

In a further configuration of the electric machine, its secondary part has at least one means for the magnetic return path. This means has, for example, a laminate stack. It is further advantageous to design the secondary part such that it is free of magnetic sources. Magnetic sources are, for example, permanent magnets or else windings to which current (electrical current) is applied.

In an advantageous embodiment, the primary part has a modular design. Owing to the number of teeth or the corresponding windings, the motor length can be varied. This results in the possibility of adapting the rated power of the motor. Attention must be paid in this case to the magnetic separation of the magnetic poles.

In a further configuration of the electric machine, regions of different magnetizability alternate in the secondary part. There is a different magnetizability, for example, between a soft-magnetic material, which can be produced from iron, for example, and air or plastic. By means of the alternating regions, the magnetic field can thus be guided within the secondary part.

In a further embodiment, the secondary part is designed such that it has teeth pointing towards the primary part. The useful flux is therefore guided within the secondary part via the teeth and via the return path which may be provided. When the flux is guided via the teeth, the flux can be guided, for example, in each case only via one tooth or via at least two teeth.

In a further advantageous configuration, the interspaces between the teeth, which can also be referred to as bars, for example, are filled. The filling consists of plastic, for example. Owing to the filling, no dirt can collect between the teeth, for example.

The first means for producing a first magnetic field is advantageously, as already described, a winding to which a current can be applied. The winding, to which a current can be applied, of a machine comprises one or more winding phases (for example U, V, W). Each winding phase comprises one or more coils.

In an advantageous embodiment of the coils they are concentrated coils which are wound around in each case one tooth (tooth-wound coils), it being possible for the tooth to bear one or more poles or permanent magnets. The tooth-wound coil is in this case at least part of a winding. The coil may be in the form of an individual coil and in the form of a split coil. The advantage of the winding is the fact that, with the aid of this winding, a changing magnetic field can be produced in a very simple manner, for example by means of an alternating current. The electric machine can also be designed, for example, such that it has a plurality of windings or coils, it being possible for a current to be applied to these windings with different phases of a three-phase source.

An electric machine can also be designed such that a secondary part has teeth, which are arranged at a modular spacing Tau_Sec in relation to one another. The primary part of the electric machine contains the second means for producing a magnetic excitation field, which is realized from a large number of means (for example many permanent magnets), which are arranged at a modular spacing Tau_Prim in relation to one another.

One embodiment of the electric machine is now characterized by the fact that the relationship between Tau_Sec and Tau_Prim can be expressed by the following equation:

$$Tau\_Sec = n * Tau\_Prim, \text{ where } n=1, 2, 3, \ldots$$

Tau_Sec can therefore be expressed by an integral multiple of Tau_Prim.

In a further embodiment of the electric machine, the relationship between Tau_Sec and Tau_Prim can be given by the following equation:

$$Tau\_Sec \neq n * Tau\_Prim, \text{ where } n=1, 2, 3, \ldots$$

The modular spacing Tau_Sec is therefore not an integral multiple of the modular spacing Tau_Prim.

In a further advantageous configuration, the electric machine according to the invention is connected to a power converter. The power converter is in particular an inverter, which can be provided for the purpose of applying current to the first means for producing a first magnetic field. The electric machine and the power converter form a drive. The electric machine can therefore also be designed such that the primary part has a plurality of windings, it being possible for an AC voltage or an alternating current with different phase angles to be applied to different windings. Owing to the use of different phase angles, a uniform force profile can be brought about during the movement of the primary part and/or the secondary part of the electric machine. Such a uniform force profile can also be formed such that different windings of a primary part of an electric machine are phase-shifted in terms of their position with respect to the secondary part such that, as a result, more uniform force development is made possible. For example in the case of a three-phase machine (m=3), a phase offset of 120° electrical is advantageously selected.

As has already been described above, a further embodiment of the electric machine has permanent magnets as further means for producing at least one second magnetic field. Advantageously, the permanent magnets are arranged on the primary part such that they produce a magnetic excitation field in each case in different directions.

In one configuration of the arrangement of the permanent magnets, the magnetization directions of the permanent magnets are parallel, but alternately opposite.

In a further embodiment of the electric machine, magnetization directions of the permanent magnets are aligned such that, owing to the movement of the toothed secondary part, an alternating magnetic flux is produced in the coil-bearing magnetic circuit sections of the primary part and, as a result, interlinking of the alternating flux of the coil arises (alternating flux arrangement).

In another embodiment, magnetization directions of the permanent magnets can be aligned such that, owing to the movement of the toothed secondary part, a pulsating magnetic unidirectional flux is produced in the coil-bearing magnetic circuit sections of the primary part and, as a result, interlinking of the unidirectional flux of the coil arises (unidirectional flux arrangement).

Advantageous configurations also result with respect to the plane in which magnetic fields are guided. Magnetic fields are guided, for example, in a plane aligned transversely to the movement direction (quadrature-axis flux magnetic circuit). This has the advantage that the laminate stack of the primary part can be varied in terms of its longitudinal extent by the number of stacked motor laminates.

In a further embodiment, magnetic fields are guided in a plane, which is oriented parallel to the movement direction (direct-axis flux magnetic circuit). This has the advantage that the width of the laminate stack can be varied by the number of stacked motor laminates.

It is also advantageous that a quadrature-axis flux alignment, i.e. a quadrature-axis flux magnetic circuit, is combined with a direct-axis flux alignment, i.e. a direct-axis flux magnetic circuit. This has the advantage that the electric machine is provided for different movement directions, which, in the case of a linear motor, are at an angle which is unequal to 0 degrees or 180 degrees.

The electric machine according to the invention may be in the form of either a rotary electric machine or a linear machine. The advantage of the embodiment of a rotary machine consists, for example, in the fact that particularly large electric machines with a large radius can be formed. In this case, both the rotor and the stator may be formed as the primary part or the secondary part. Advantageously, the stator is formed as the primary part, since the current supply is thereby facilitated.

In a further configuration of the electric machine, it is in the form of a linear machine, as already described. In the case of a linear machine, there is in particular the advantage that the secondary part does not have any means for producing a magnetic field. The secondary part can therefore have a very simple and cost-effective design.

In a further advantageous configuration, not only one secondary part, but at least two or more secondary parts, can be moved by means of the primary part of the electric machine. This is conceivable, for example, in a transport system in which a very wide variety of secondary parts, which bear, for example, transport bodies such as boxes, can be moved by means of a primary part. In this case, the primary part is used, for example, for one or more of the following tasks: positioning of the secondary part, acceleration of the secondary part, braking of the secondary part.

The electric machine can be designed flexibly such that either the primary part is movable or the secondary part is movable or both parts are movable.

In a further configuration of the electric machine, it has a primary part and two secondary parts. The primary part is arranged between the two secondary parts. This arrangement is designed such that a magnetic circuit, which is formed by a useful magnetic flux, is closed via the primary part and both secondary parts.

In a further configuration of the electric machine, it has two primary parts and one secondary part. The secondary part is arranged between the two primary parts. The primary parts and the secondary part can be designed such that a magnetic circuit, which is formed by a useful magnetic flux, is closed via the two primary parts and the secondary part.

However, the primary parts and the secondary part can also be designed such that a magnetic circuit, which is formed by a useful magnetic flux, is closed via in each case one primary part and the common secondary part.

The invention relates not only to the electric machine alone but also to the primary part of the electric machine. The primary part of an electric machine is designed according to the invention such that it has a first means for producing a magnetic field, the primary part having at least one further means for producing a magnetic field, the first means and the further means being aligned with respect to one another such that the magnetic fields produced by the first and the further means (second means and/or third means, . . . ) can be superimposed such that these magnetic fields can be strengthened or weakened. The strengthening or weakening in this case relates to the resulting entire magnetic field which, depending on the magnetic field produced by the first means, can be increased or reduced in size.

In this case, the primary part is in particular a primary part of the above-described electric machine in one of the embodiments.

The secondary part of an electric machine, in particular an electric machine in accordance with one of the above-described embodiments, has at least one means for guiding a magnetic field, the secondary part being free of magnetic sources.

The invention also relates to a transport device. The transport device advantageously has an electric machine according to the invention. The transport device has, for example, at least one primary part and at least one secondary part. If the transport device has a plurality of primary parts, they can be driven, for example, independently of one another as a plurality of separate motors or else jointly as one motor. In an arrangement of a plurality of primary parts in a plane, which has, for example, an x axis and a y axis, a two-dimensional movement can be realized by the total number of primary parts being split into two groups. A first group is provided for movements in the x axis, and a second group is provided for movements in the y axis. Correspondingly this also results in the alignment. These two groups are, for example, distributed in the xy plane in a checkered pattern. An active face of the secondary part is then correspondingly split into two regions for the x movement direction or y movement direction.

BRIEF DESCRIPTION OF THE DRAWING

The following figures show examples of configurations according to the invention of electric machines, as follows.

DETAILED DESCRIPTION OF THE PREFERRED EMBODIMENTS

Figure 1:
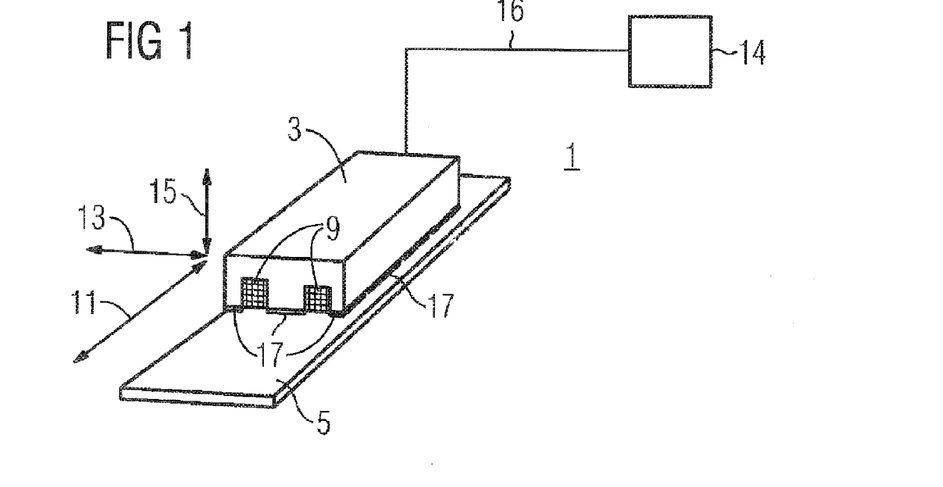
FIG. 1 shows a basic illustration of a linear motor.
Figure 2:
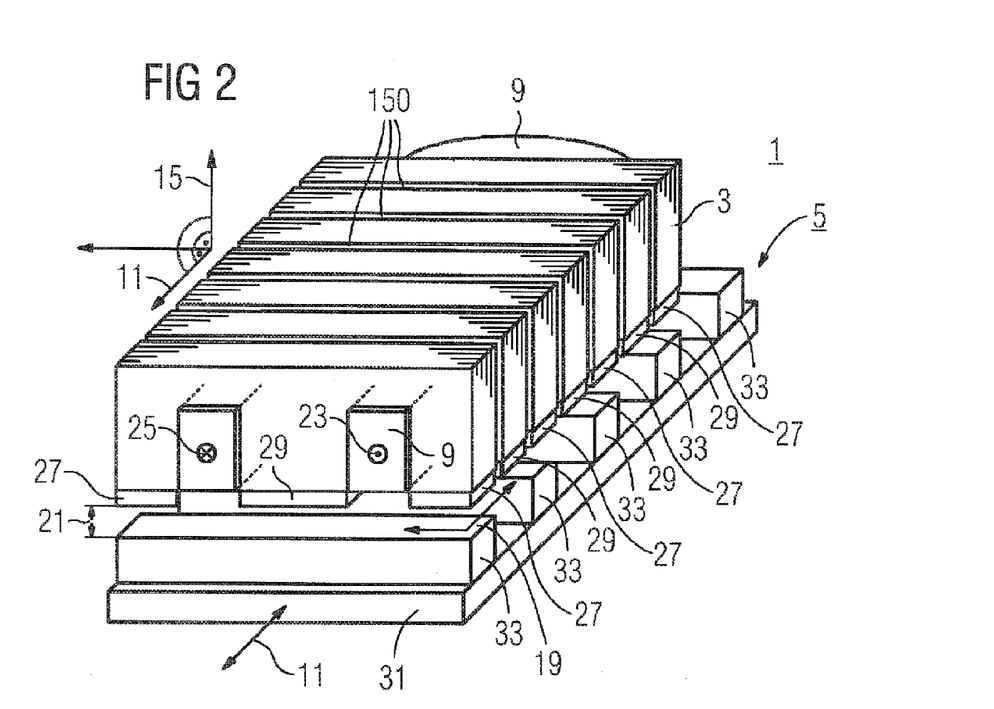
FIG. 2, 3, 5 show various embodiments of linear motors according to the invention with permanent magnets on the primary part.

The illustration in FIG. 1 shows an electric machine 1. The electric machine 1 has a primary part 3 and a secondary part 5. The primary part 3 has a winding 9 and permanent magnets 17. The movement direction of the primary part 3 is identified by means of a double arrow, which runs in the longitudinal direction 11. A further double arrow indicates the transverse direction 13. The normal 15 is determined by means of a third double arrow, the normal being based on an air gap plane 19, the air gap plane 19 not being illustrated in FIG. 1. The air gap plane 19 is illustrated in FIG. 2, however. The electric machine 1 is a linear motor which can be driven by means of a power converter 14, which is connected via a connection cable 16.

The illustration in FIG. 2 shows an electric machine 1. The primary part 3 is in the form of a laminate stack, the primary part 3 having a winding 9. The winding 9 is a phase winding, it being possible for an alternating current to be applied to this phase winding. The direction of the current is illustrated in FIG. 2 at one instant. In this case, the direction is identified by means of a dot 23 or by means of a cross 25. The laminated primary part 3 has permanent magnets 17 on the side facing the secondary part 5.

The permanent magnets 17 are fitted to the primary part 3 such that their magnetization alternates in the direction of the normal 15. The magnets (permanent magnets 17) therefore produce a magnetic flux which alternately points upward (toward the primary part 3) and downward (toward the secondary part 5). North/south permanent magnets (N/S) 27 (the magnetization direction points toward the secondary part) therefore alternate with the south/north permanent magnets (S/N) 29 (the magnetization direction points toward the primary part 3). An effective air gap 21 is formed between the primary part 3 and the secondary part 5.

This effective air gap 21 covers the air gap plane 19. The movement of the electric machine 1, which in the present case is a linear machine, takes place in the direction of the longitudinal direction 11. In this case, it is possible either for the primary part 3 to be stationary and for the secondary part 5 to move or for the secondary part 5 to be stationary and for the primary part 3 to move beyond the secondary part 5.

The winding 9 is a first means for producing a first magnetic field, and the permanent magnets 17 are further means, for producing further magnetic fields. The illustration in FIG. 2 shows a quadrature-axis flux embodiment of the electric machine 1. In the quadrature-axis flux embodiment, the secondary part 5 is designed, for example, such that it has a mount 31 and bars 33. At least the bars 33 have a laminated design. The lamination is such that laminate follows on from laminate in the longitudinal direction 11. The bars 33 are adhesively bonded or soldered or welded, for example, to the mount 31 or connected to one another using a combination of fixing possibilities. The lamination is advantageous for avoiding eddy currents. If the negative eddy current effects are not very pronounced (for example in applications with a sufficiently low electrical fundamental frequency), a lamination can be dispensed with, and inexpensive solid parts can be used.

FIG. 2 also shows the pole pitch gaps 150 between the magnetic poles of the primary part 3. The axial magnetic leakage is considerably reduced on account of this magnetic separation. This separation can be achieved in a simple manner, for example by virtue of gaps in the laminate stack. The gaps are at least partly filled with amagnetic materials, in particular, cooling duct elements 151 or spacers being provided in the gaps of the laminate stack, as in FIG. 10 or FIG. 11.

Figure 3:
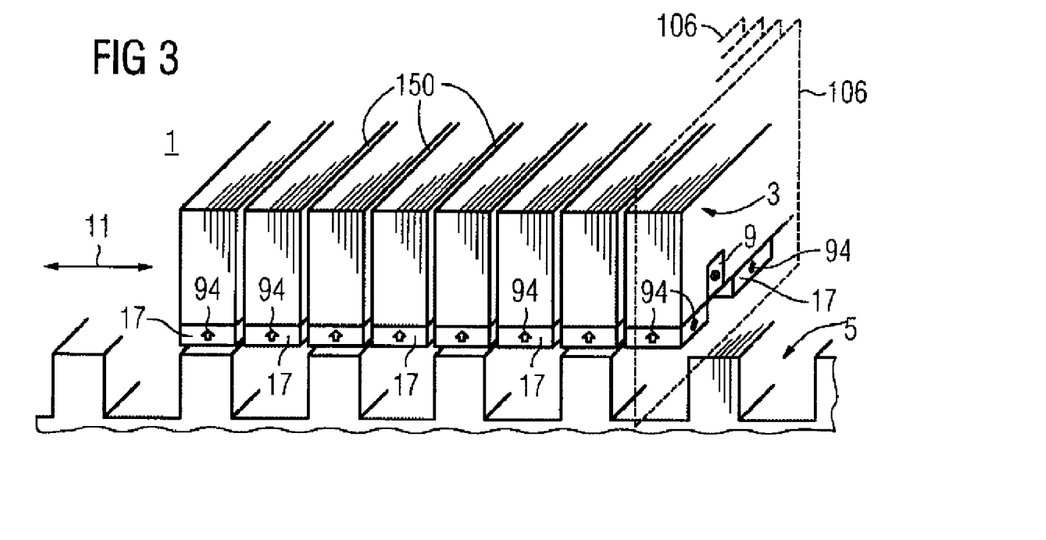

The illustration in FIG. 3 shows, schematically, the geometry of a quadrature-axis flux linear motor which has a magnetic excitation field, which is produced by the permanent magnets 17. A useful magnetic flux is guided in a plane 106 according to FIG. 3 aligned transversely with respect to a movement direction 11. The useful magnetic flux is the magnetic flux which is coupled to or interlinked with the winding 9. This useful magnetic flux aligned in such a way forms a quadrature-axis flux magnetic circuit.

The linear motor has a laminated primary part 3 and a laminated secondary part 5. The stacking direction of the laminate stacks is indicated in basic form. The magnetization direction 94 of the permanent magnets 17 is illustrated by means of arrows. The possible movement direction of the primary part 3 is the longitudinal direction 11.

Figure 4:
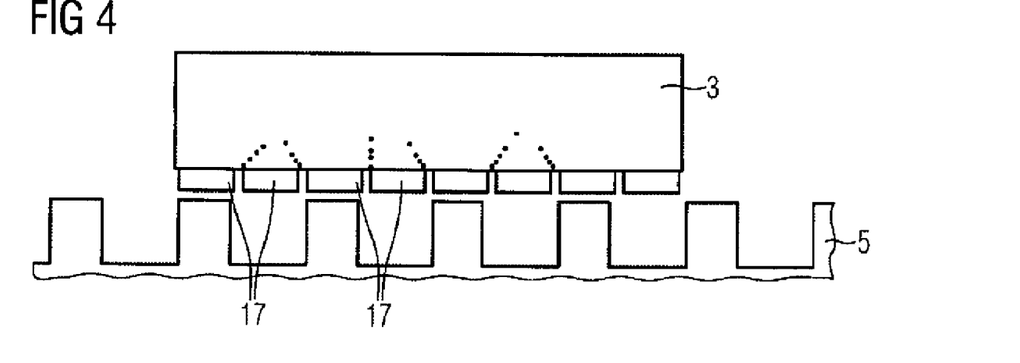
FIG. 4 shows the profile of magnetic fields in a linear motor with pole pitch gaps (prior art)

In this case, the axial magnetic leakage flux (●), which is otherwise present and is shown in FIG. 4 in the case of an electric machine 1 without pole pitch gaps 150, is now reduced.

Figure 5:
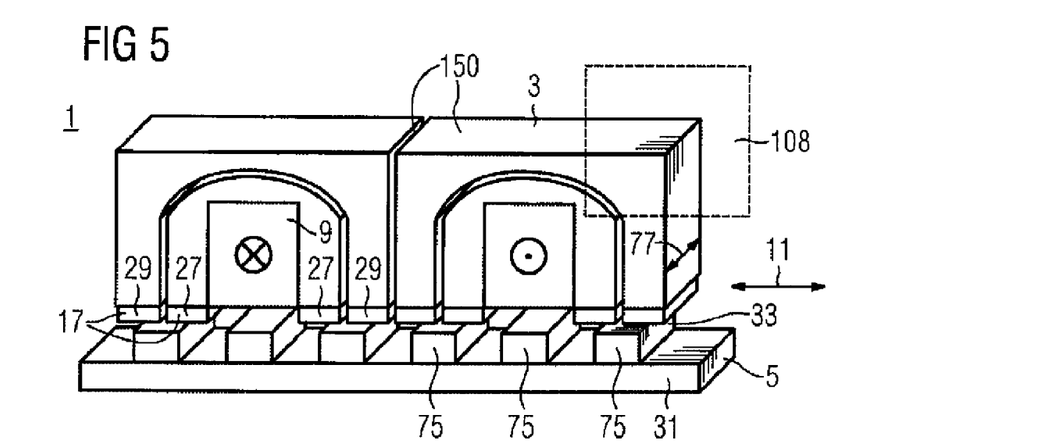

The illustration in FIG. 5 shows a primary part 4 and a secondary part 5. The primary part 4 and the secondary part 5 form the electric machine 1, the electric machine 1 having a direct-axis flux arrangement. The direct-axis flux arrangement is characterized in particular by the fact that the magnetic fields are not closed transversely with respect to the movement direction of the primary part or the secondary part, but along the movement direction of the primary part or along the movement direction of the secondary part. The magnetic flux which is guided in a plane 108, the plane 108 being oriented parallel to the movement direction 11 is a useful magnetic flux. The useful magnetic flux is the magnetic flux which is coupled to the winding 9. This useful magnetic flux aligned in such a way forms a direct-axis flux magnetic circuit.

In FIG. 5, the secondary part 5 is laminated both in the region of the mount 31 and in the region of the bars 33. The arrangement of the magnets in the air gap plane 19 is not checkered but strip-shaped, in contrast to the quadrature-axis flux arrangement. In the direct-axis flux variant, the magnets are aligned substantially parallel to the bars (flux concentrating pieces). In order to reduce force ripples, however, the magnets can be positioned in a targeted manner in a type of skewed position.

In a further advantageous configuration, the secondary part 5 is produced from laminates, which are stacked one behind the other over the motor width. In the case of such laminates, the mount 31 and the teeth 75 comprise one part. Owing to the laminates being stacked one behind the other, the toothed structure of the secondary part with the bars 33 results. The type of lamination is indicated in FIG. 5. The secondary part may have a multi-part design, for example, in the longitudinal direction, with the result that a secondary part 5 adjoins a subsequent secondary part. Such further secondary parts adjoining one another in the movement direction are not illustrated in the illustration in FIG. 5, however. The illustration in FIG. 5 further shows the permanent magnets. The permanent magnets are N/S permanent magnets 27 or S/N permanent magnets 29. These permanent magnets extend, for example, over an entire laminate stack width 77 of the primary part 3. The pole gaps 150 are designed differently in order to reduce the magnetic leakage.

Figure 6:
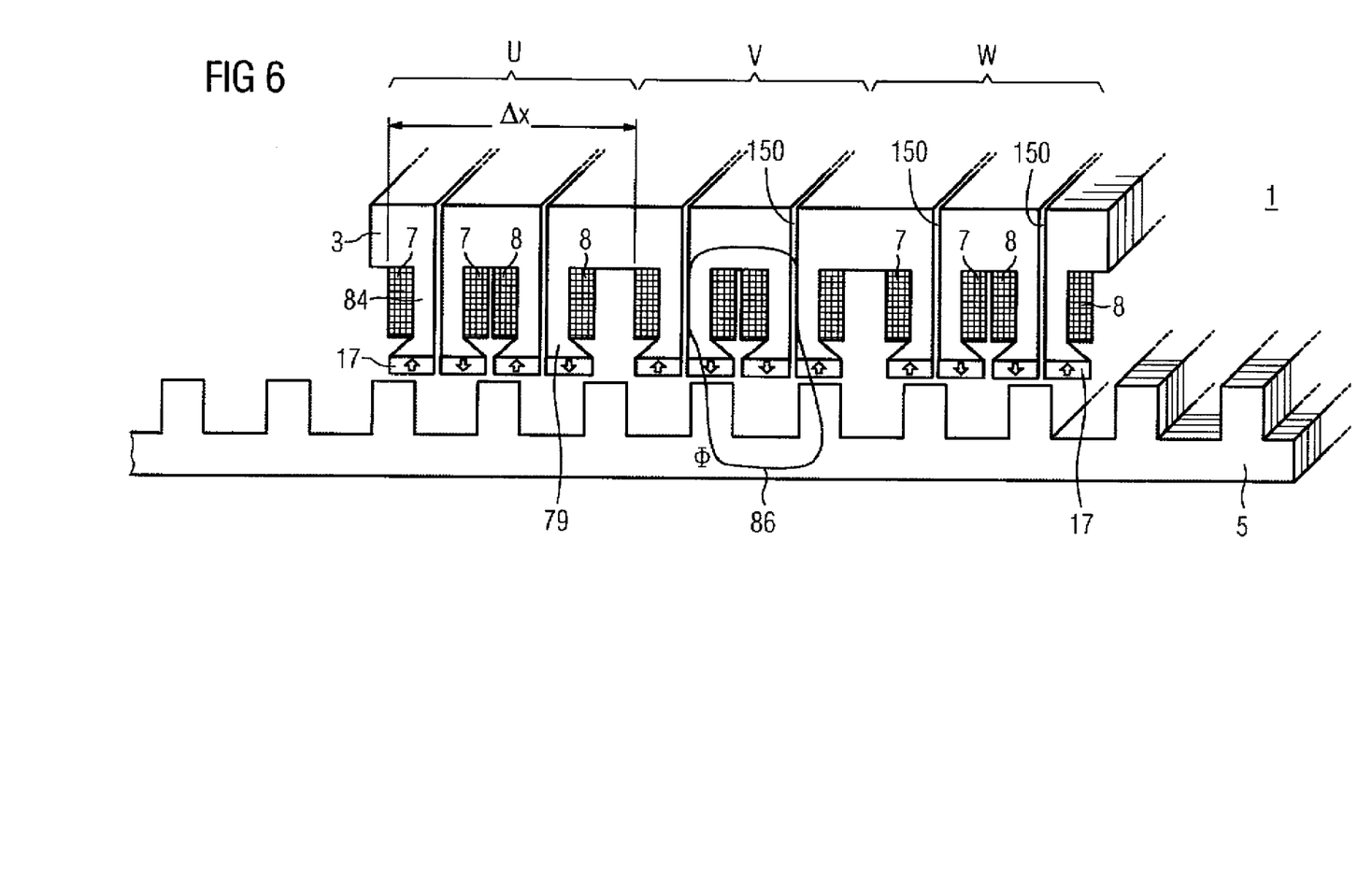
FIG. 6 shows a three-phase illustration of a linear motor, FIG. 7, 8 show a rotary electric machine, FIG. 9, 10 show exemplary embodiments of the pole pitch gap.

The primary part 3 is designed in a further embodiment according to FIG. 6 such that it has pole shoes 79. The pole shoes 79 widen the bearing face for permanent magnets 27, 29. As a result, the force yield of the electric machine 1 can be increased. Since, owing to the surface for positioning the permanent magnets being increased in size, the region in which a winding 9 can be inserted in the primary part 3 is narrowed, the primary part 3 is advantageously designed such that it has a coil former. The coil former has both a pole shoe 79 and a winding neck 84. The winding 9 can be wound around the winding neck 84. Further motor winding phases (for example V and W) can be realized by primary parts 3 having an identical design. In the position illustrated, the permanent magnets 27 and 29 produce the magnetic excitation fluxes 86, whose sum forms the flux linkage $\psi$ of the winding 9. As can be seen from the illustration in FIG. 6, the magnetic excitation fluxes 86, which represent a useful flux, form a direct-axis flux magnetic circuit.

Each winding phase (U, V, W) is provided for one phase of a three-phase power supply system. The required phase shift is achieved by the geometrical offset of the winding phases. The geometrical offset $\Delta x$ in this case corresponds to 120° electrical for the three-phase machine illustrated. Not only is one tooth-wound coil of the winding 9 associated with each winding phase U, V and W, but its two tooth-wound coils 7 and 8 for in each case one winding phase U, V and W.

Figure 7:
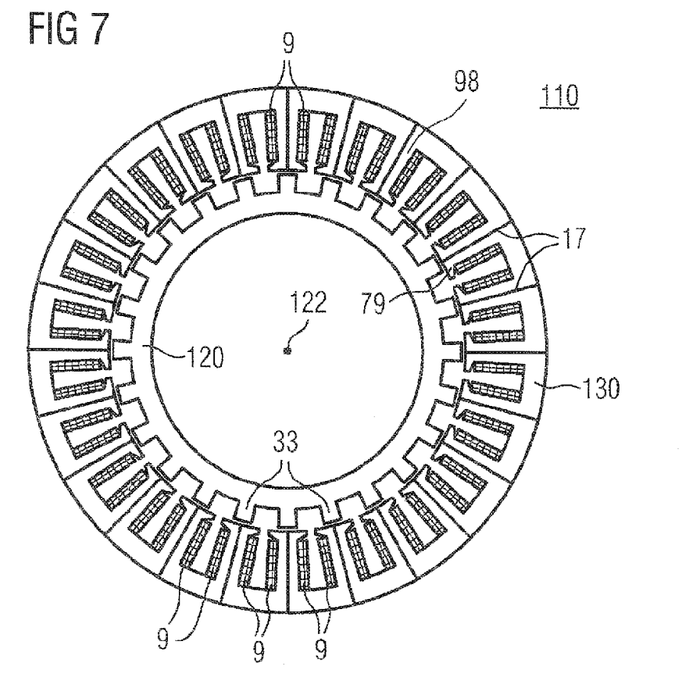

The illustration in FIG. 7 shows a rotary electric machine 110. This rotary electric machine 110 is, for example, a synchronous motor or else a synchronous generator. The electric machine 110 has a stator 130 and a rotor 120. The rotor 120 can rotate about an axis 122. The rotor 120 is the secondary part of the electric machine 110. The stator 130 is the primary part of the electric machine 110. The rotor 120, as do the secondary parts of the above-described linear motors, has teeth 33. The stator 130 of the electric machine 110 has windings 9 about teeth 98, which have pole shoes 79, and permanent magnets 17. The embodiment of the rotary electric machine 110 in FIG. 7 is only one example of various embodiments of the rotary electric machine.

Other embodiments which are not illustrated of the rotary electric machine result, for example, by similarly transferring the embodiments of the linear motors in accordance with the preceding descriptions in relation to the figures. Furthermore, it is also possible in the case of rotary machines to specify embodiments in which two secondary parts are assigned to a primary part or in which two primary parts are assigned to a secondary part. These variants are not illustrated in the figures, however.

Figure 8:
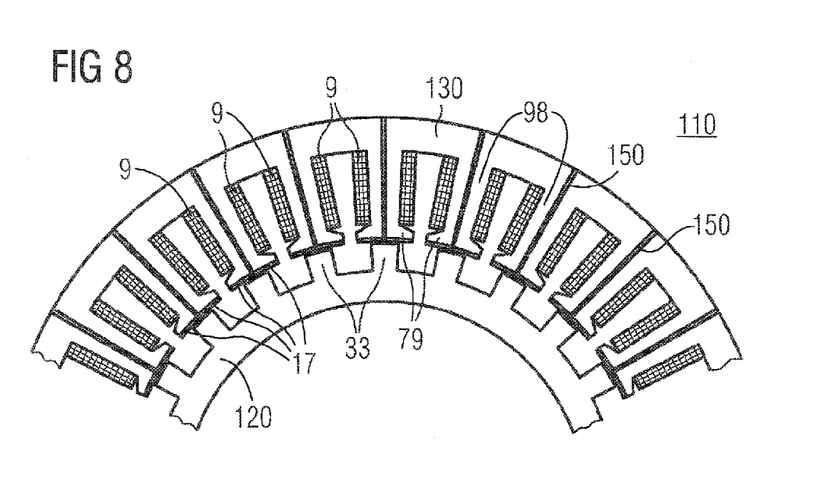

The illustration in FIG. 8 shows a detail from the illustration in FIG. 7. In FIG. 8, the positioning of the permanent magnets 17 at the effective air gap 21 is illustrated in more detail on the physical basis of the previous embodiments.

Figure 9:
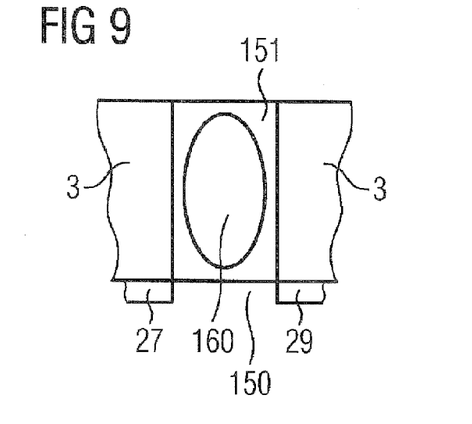

FIG. 9 shows, in a further detailed basic illustration, the pole gap 150 which is provided with a cooling duct element 151. The cooling duct element 151 has a cooling duct 160 through which a cooling liquid flows during operation of the electric machine. In this case, the cooling duct element 151 is formed from amagnetic material, for example plastic or ceramic. It is critical here that no axial leakage fields are able to form between the magnetic poles. The leakage fields as illustrated in FIG. 4 as prior art are therefore avoided.

Figure 10:
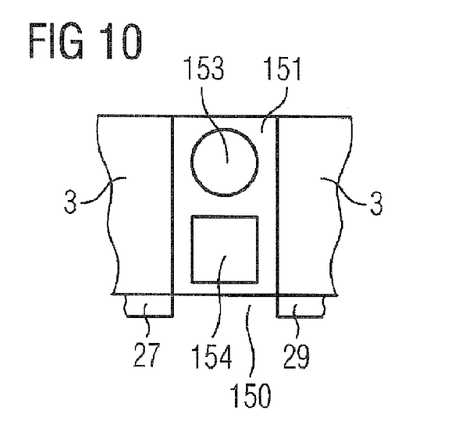

FIG. 10 shows that cooling duct elements 151 can also have a plurality of differently shaped cooling duct cross sections 153, 154. It is therefore possible to adjust interconnection of the cooling ducts in the primary part 3, this interconnection being made either parallel or in opposite directions.

Figure 11:
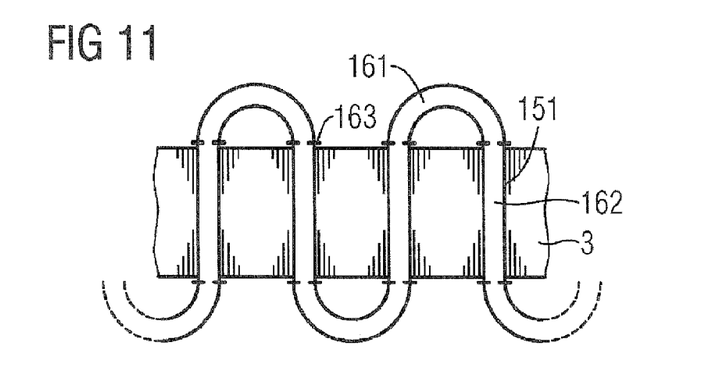
FIG. 11 shows a cooling coil in the linear motor.

FIG. 11 shows, in a basic illustration looking at a primary part 3 of a linear motor, how the cooling duct elements 151 can be arranged in the pole gaps 150. A meandering cooling coil can be of integral or multi-part design in this case. In the case of multi-part design, it is advantageous when the straight cooling duct elements 162 are connected to curved baffles 161 via suitable means 163.

What is claimed is:

1. An electric machine, comprising a primary part and a secondary part, wherein the primary part includes
    a laminate stack having teeth forming magnetic poles, with a pole pitch gap with air or an amagnetic material disposed between at least some adjacent magnetic poles for reducing axial magnetic leakage,
    at least one phase winding for producing a first magnetic field, said at least one phase winding encompassing at least one pole pitch gap, and
    a single permanent magnet arranged on each end face of a tooth of the laminate stack in one-to-one correspondence and facing an effective air gap between the primary part and the secondary part, wherein each permanent magnet has a single magnetization direction perpendicular to the end face.

2. The electric machine of claim 1, wherein a width of the pole pitch gap corresponds at least to a width of the effective air gap.

3. The electric machine of claim 1, wherein the pole pitch gap provides air cooling.

4. The electric machine of claim 1, wherein the pole pitch gap comprises at least in sections cooling duct elements having cooling ducts configured for connection to a closed-loop liquid cooling circuit.

5. The electric machine of claim 4, wherein the primary part is made of a laminate stack and the cooling ducts extend in or on the laminate stack in a meandering fashion.

6. The electric machine of claim 1, wherein a tooth pitch of the secondary part is an integer multiple of a magnet pitch of the primary part.

7. The electric machine of claim 1, wherein a tooth pitch of the secondary part is different from an integer multiple of a magnet pitch of the primary part.

8. The electric machine of claim 1, wherein the electric machine is a machine selected from the group consisting of a synchronous machine, a linear machine, a linear hybrid motor and a rotary machine.

9. The electric machine of claim 1, wherein the secondary part includes at least one means providing a magnetic return path, said secondary part being exclusive of magnetic sources.

10. A transport device, comprising an electric machine with a primary part and a secondary part, wherein the primary part includes
- a laminate stack having teeth forming magnetic poles, with a pole pitch gap filled with air or an amagnetic material disposed between at least some adjacent magnetic poles for reducing axial magnetic leakage,
- at least one phase winding for producing a first magnetic field, said at least one phase winding encompassing at least one pole pitch gap, and
- a single permanent magnet arranged on each end face of a tooth of the laminate stack in one-to-one correspondence and facing an effective air gap between the primary part and the secondary part, wherein each permanent magnet has a single magnetization direction perpendicular to the end face.

11. The transport device of claim 10, wherein the electric machine is configured for two-dimensional movement in a plane.

* * * * *